United States Patent Office 2,973,928
Patented Mar. 7, 1961

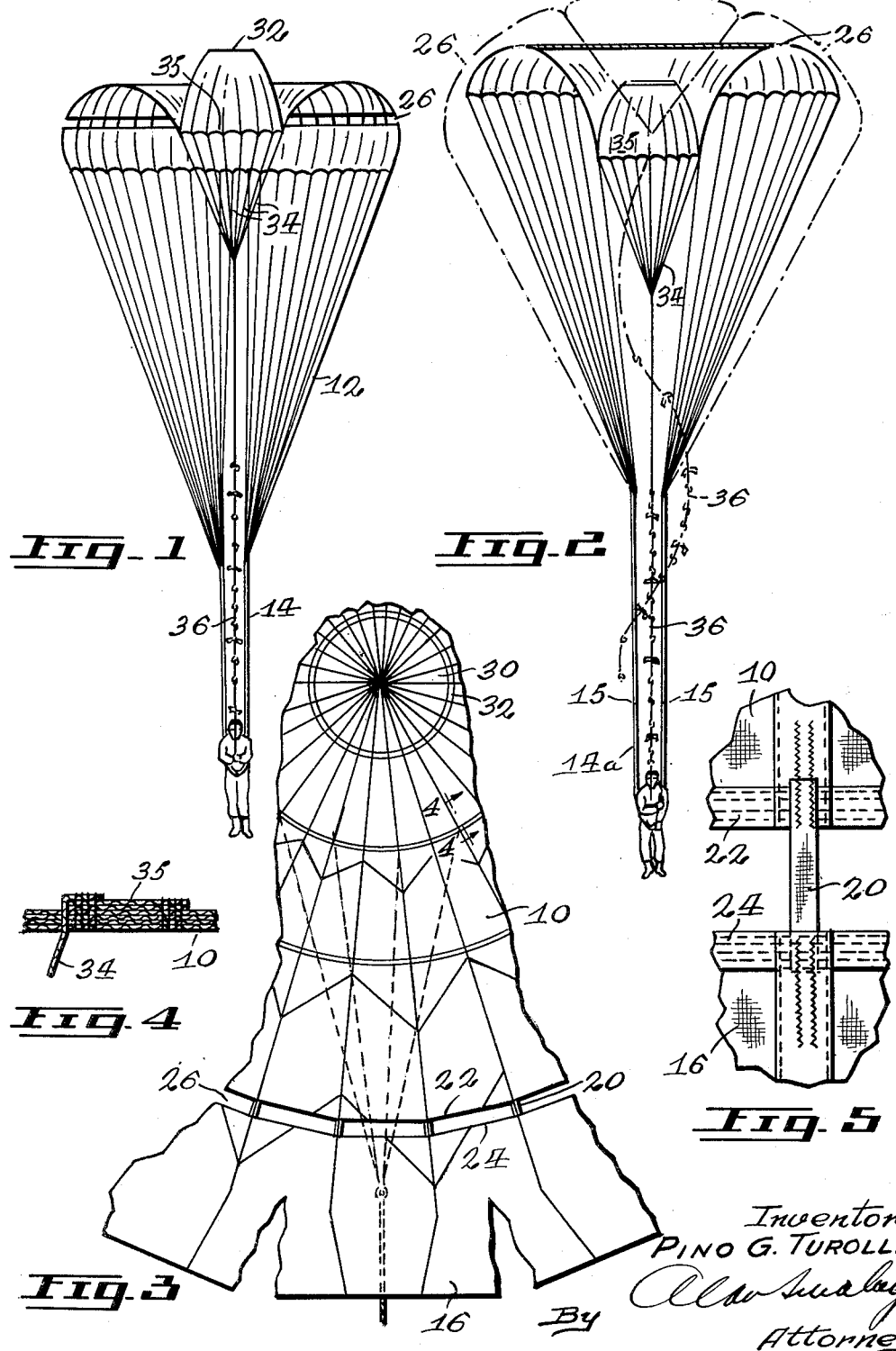

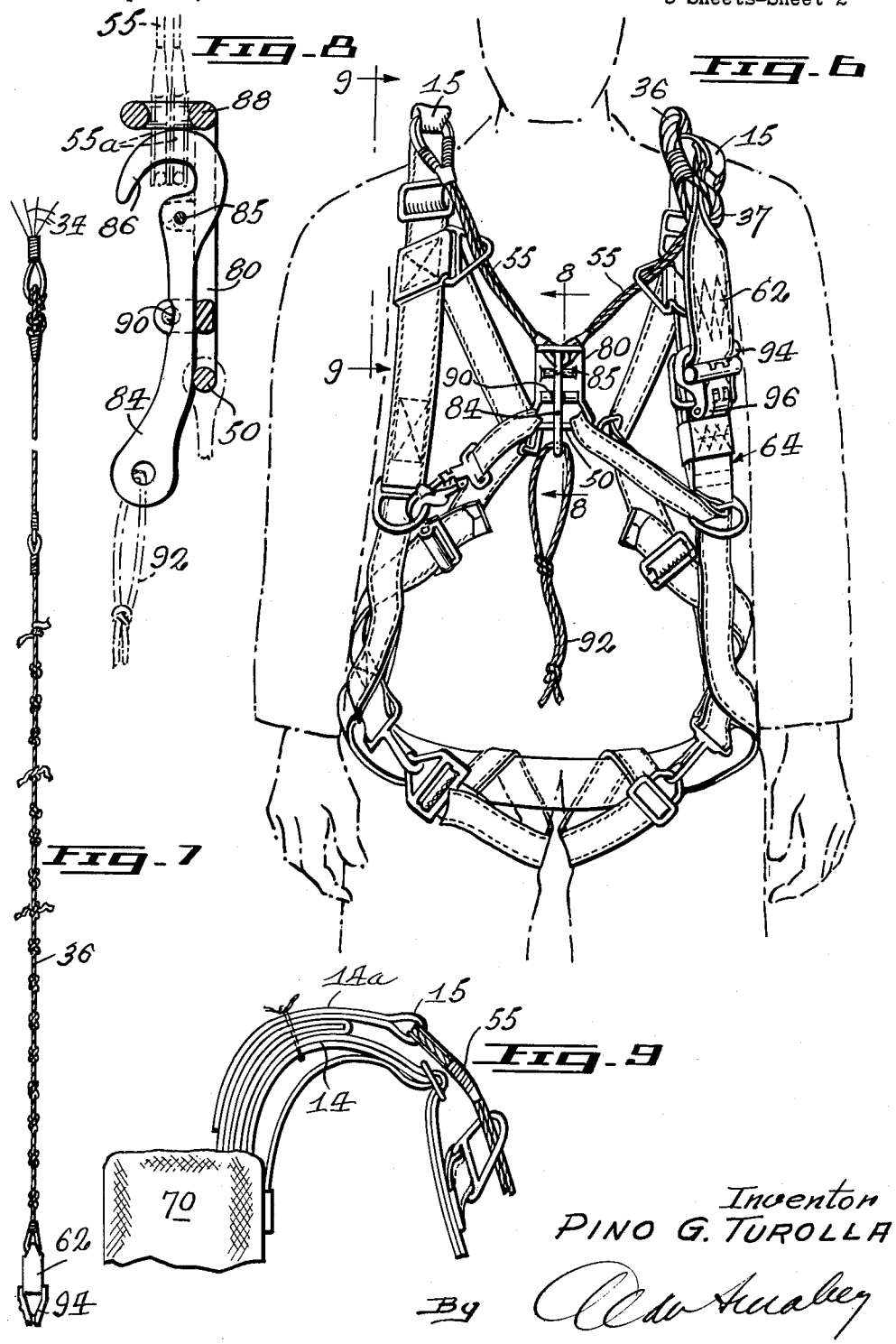

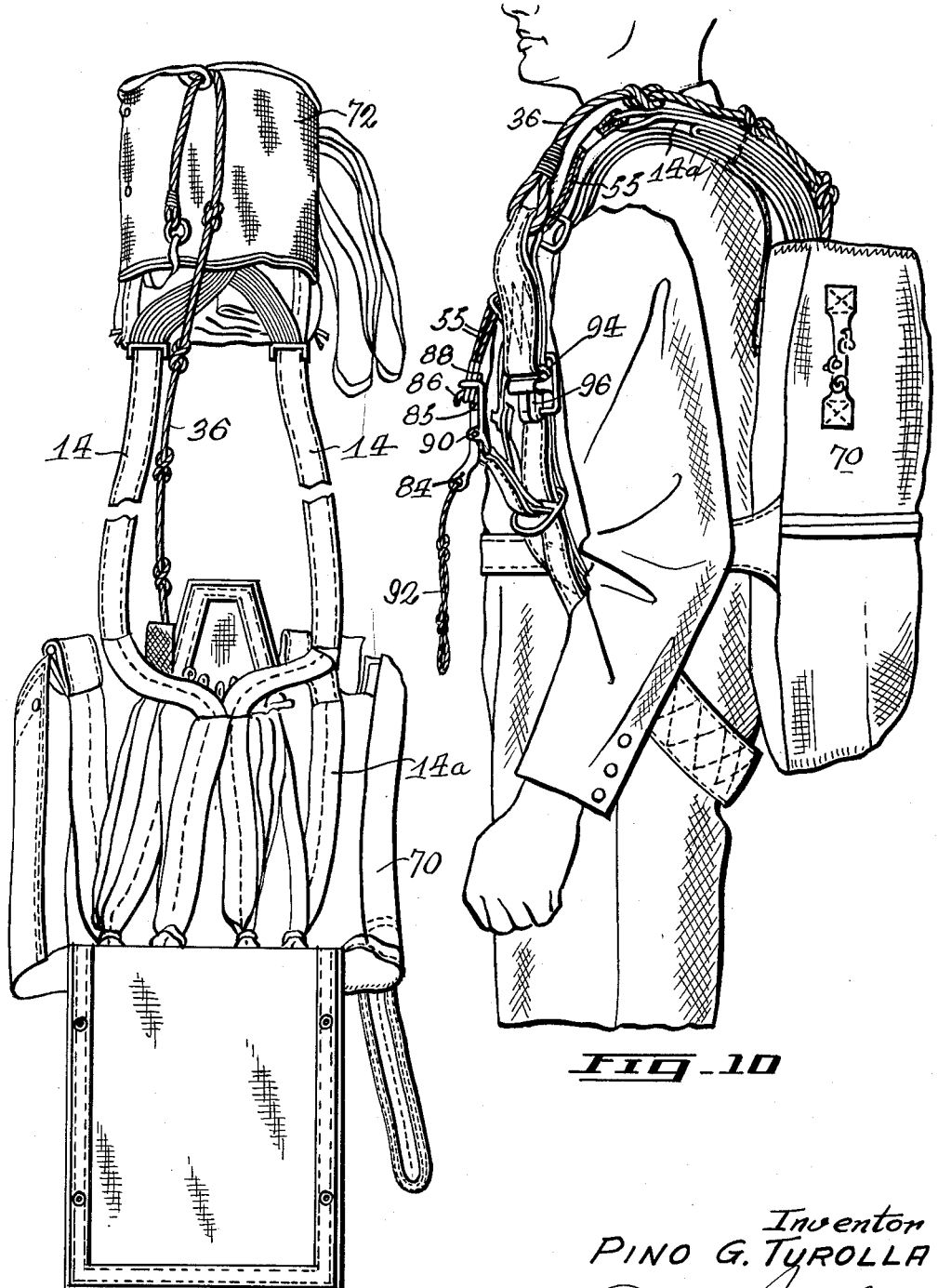

2,973,928
PARACHUTE CONSTRUCTION
Pino G. Turolla, 3435 Barclay Ave., Apt. A,
Montreal, Quebec, Canada
Filed Sept. 15, 1958, Ser. No. 761,172
5 Claims. (Cl. 244—152)

The present invention relates to improvements in the construction of parachutes.

Parachutes of the type generally in use at the present time have a common disadvantage in that there is no means of controlling the speed of descent nor stopping the rotating or pendulum-like swinging movement of the weight being thus supported. In particular, when parachutes are being utilized to drop personnel, there is always the danger that, due to the changing currents of air, and the unstable characteristics mentioned above, they first of all may be carried well away from the selected dropping point and secondly they may be swung against structures or trees when they approach the ground.

Attempts have been made to overcome these problems by providing modified chute constructions including supplementary chutes or openings and flap surfaces which can be controlled to increase the speed of descent.

For example, United States Patent 2,127,895 to Tingle, August 23, 1938, shows a parachute construction wherein a supplementary flap fitted within the body of the chute is pulled inwards by a central control line to uncover a plurality of openings so as to allow large volumes of the air trapped in the chute body to escape and thus accelerate the descent. In accordance with this patent, release of the control line is intended to allow the flap to resume its normal position and block the openings thus causing the chute to resume its normal shape giving maximum weight-carrying surfaces.

United States Patent 2,342,287 to Lisi, February 22, 1944, shows a further attempt to overcome the problems mentioned wherein a second centrally located smaller chute is combined with the usual larger chute and the outer periphery of the smaller chute is provided with a central control line whereby the large chute can be collapsed from the center to accelerate the descent as before. The idea in this patent is that the second smaller chute will cause the larger chute to open to normal once the control member has been released.

However, in both of these prior art constructions, there is one common disadvantage and that is, due to the particular construction and disposition of the means for decreasing the effective bearing surface of the chute the main surface of the chutes will be folded into an area where the airfoil surface tends to create a vacuum. Accordingly, it is thought that the folding or collapsing characteristics of these chutes will be intensified to a point where it will be extremely difficult for the main body of the chute to again unfold to give the necessary maximum supporting surface.

The present invention recognizes and overcomes these disadvantages by providing a parachute design which is adapted to:

(a) Eliminate the negative angles of present parachutes.

(b) In the case of military personnel, increase the efficiency of a surprise attack by allowing rapid controlled descent enabling troops to maintain relatively close contact.

(c) Regulate the speed of descent, neutralizing the "swing" at the moment before landing by providing means whereby the conformation of the chute is regulated to give maximum supporting area at that moment.

(d) Make it possible to jump from high altitudes, and by controlled accelerated descent, neutralize contrary air drift.

(e) Enable paratroopers to "spot" land inside a small objective by providing means for controlling and checking speed of descent.

This improved parachute construction is based on the principle of exploiting the external pressure of the supporting surface, rather than the internal surface. Further, it does not necessitate lengthy additional training for the paratrooper.

Essentially, a parachute constructed in accordance with the invention utilizes a main envelope or body of the usual hemispherical overall shape with the usual shroud lines attached to risers which are connected to and support the weight to be carried. Supplementary means are embodied in the central top portion of the body whereby it can be collapsed inwardly under the control of extensions to the risers in combination with a central cable or control line which extends downwardly from the central axis of the chute to an accessible position relative to the load being carried.

In accordance with the preferred form of the chute body in accordance with the invention air pressure control means are provided in the body of the chute in the form of an annular vent or slot spaced inwardly of the lower periphery and extending completely around the chute.

The inner shroud lines connecting the chute center portion to the control line are disposed about an annular line spaced inwardly of the central opening at the apex of the chute body so that the chute is adapted to adopt three positions during the descent; a first, or opening position, which places the body of the chute in a conformation adapted to give a slightly greater speed of descent than a standard chute; a second position, by extension of the risers connected to the shroud lines and under the control of the operator, alters the conformation and decreases the bearing surface of the chute so as to rapidly accelerate the speed of descent; and a third position, which can be under the control of the operator, or controlled by automatic means, which instantaneously brings the chute body into a conformation giving full bearing capacity checking or braking the speed of descent.

A main feature of the present invention in contrast to the prior art arrangements known is that the controlled changes of chute contour or bearing surface are accomplished by the pressure of the air applied to the chute during its descent and not by tension applied to the central control line or the shroud lines. This is accomplished by maintaining the length of the control line between the load carried and the chute central portion while extending the length of the risers connected to the primary shroud lines between the first two positions previously mentioned. This means in effect that the outer peripheral portions of the chute rise relative to the retained central portion. By this rising the annular air control vent is also moved up substantially to the center of the remaining effective bearing surface of the chute, again increasing the speed of descent. In the third position, the release of the central control line permits the central portion of the chute to rise relative to the outer periphery to bring the chute canopy to its maximum bearing contour and capacity.

The location of the air pressure control vent and controlling of the central chute portion are such that they cannot be moved into a "dead" or vacuum area as might be caused by the airfoil action of the chute body and therefore the required variance in chute conformation and bearing surface area is instantaneous and sure.

This application is a continuation-in-part of United States application, Serial No. 582,558, filed May 3, 1956, now abandoned, which was a continuation-in-part of United States application, Serial No. 479,600, filed January 3, 1955, now United States Patent 2,784,927.

Having thus generally described the nature of the invention, reference will be made to the accompanying drawings wherein there is shown by way of illustration a preferred embodiment thereof, and in which:

Figure 1 is a diagrammatic view showing the present parachute construction as it would appear immediately after having been opened.

Figure 2 is a diagrammatic view of the parachute construction shown in Figure 1 to show the second and accelerated position of the chute; the full open position being shown in dotted lines.

Figure 3 is a diagrammatic view of a typical portion of the chute body to illustrate the relative position of the annular air vent and the annular attachment point for the controlling shroud lines to the center portion.

Figure 4 is a cross-sectional view of the seam arrangement at the point of attachment of the shrouds leading to the center control line.

Figure 5 is an enlarged detail view of the portions of the chute body bordering the annular air vent to illustrate the tape connections between the lower peripheral skirt panel and the main body of the chute.

Figure 6 is a diagrammatic view of the harness of a chute constructed in accordance with the invention to illustrate in more detail the releasing means for the central controlling line and main canopy risers.

Figure 7 is a diagrammatic view of the control line leading to the shrouds controlling the chute center portion.

Figure 8 is a view of the harness shown in Figure 6 and partially in section along the line 8—8 to illustrate the quick release mechanism for the central control line in more detail.

Figure 9 is a side view along the line 9—9 of Figure 6 of the upper portion of the parachute harness showing the end portions of the main risers 14 and the supplementary riser portions 14a and their connections to the chute harness.

Figure 10 is a diagrammatic view in side elevation of the chute as it would appear when packed to show the relative position of the center portion control line and the quick release apparatus.

Figure 11 is a diagrammatic view, by way of illustration, with the chute pack partially open showing the main chute body in a separate pack with the extendable main risers leading to the main chute shrouds shown in packed position.

With particular reference to Figures 1 and 2 of the drawings, the chute body in accordance with the present invention is illustrated in a preferred form comprising a main body 10 of substantially hemispherical outline when completely open, to which there is attached about the outer periphery 16 the usual shroud lines 12, which in the present case are connected to the main risers 14. The main risers 14 are constructed and packed so as to first extend to a predetermined length from the end of the shroud lines to the harness attached to the person using the chute, and then by controlled releasing means to unfold and extend further to provide an extra riser length 14a which allows the shroud lines 12 and outer periphery of the chute to proceed upwards, relative to the center portion of the chute, as will be described in more detail later.

The lower peripheral portion or skirt 16 of the chute to which the shroud lines are attached is made as a separate panelled section of substantially annular outline with a curvature when fully inflated corresponding with the outline of the chute body. This portion 16 is attached to the main body of the chute by a series of regularly circumferentially spaced apart straps or webs 20 which are seamed at each end to the lower peripheral edge 22 of the main chute body 10 and the upper peripheral edge 24 of the lower chute portion 16. With this arrangement, a vent or slot 26 of annular formation is provided which extends completely about the body of the chute.

This vent or slot 26 provides a controlling air outlet to permit passage of air trapped within the chute body during descent and by the currents of air passing therethrough also acts as a stabilizing factor preventing oscillation of the chute as will be described later.

The main chute body 10 is also provided with a central opening 30, the marginal edge of which is secured to a resilient ring 32.

A further plurality of secondary shroud lines 34 are connected in regular spaced apart relationship to the main body of the chute along an annular reinforced seam or line 35 disposed in spaced apart relationship inwardly from the resilient ring 32, see Figure 4. These shroud lines 34 are connected centrally to a main control line 36 which extends to and is connected with the parachute harness by means of a quick release toggle so that it can be freed as desired by the operator.

In a preferred construction the annular vent 26 is about six (6) inches in depth and the vent is located about sixty (60) inches above the lower peripheral edge of the skirt portion 16. The annular reinforcing band or seam 35 is located about eighty (80) inches inwardly of the apex of the chute canopy.

The length of the control line 36 is such that when the chute is initially opened to the position shown in Figure 1, the annular chute seam 35 to which the shroud lines 34 are attached is held at a predetermined distance relative to the body suspended from the chute. The length of the control line 36 in the first position relative to the length of the combined primary shrouds and first portions of the risers 14 is predetermined so that the lower peripheral edge of the skirt portion 16 is located below the attachment point of the secondary shrouds 34 with the annular seam 35 of the canopy central portion. In this condition the central portion of the chute body above the annular seam 35, under the influence of the air trapped within the chute body, rises as shown and acts as a pilot chute. The air passing through the central opening 30 acts as a stabilizing factor to this center chute portion.

In this position, the harness risers 14 have been released to a certain point where the shrouds 12 hold the outer periphery of the chute body, relative to the center portion, to the conformation shown in Figure 1. As previously mentioned, there is an auxiliary length of riser 14a provided which when the chute is in the position shown in Figure 1 is still folded within the chute pack. The release of this additional harness strap length is also controlled by a quick release arrangement and under the control of the operator. When it is desired to accelerate the descent so as to avoid drifting from a definite target area, this first quick release arrangement, indicated generally at 50, is pulled so that the additional length of the risers 14a is released, which allows the shrouds 12 and chute periphery to go up relative to the chute body center portion so as to reduce the effective bearing area of the chute. In this position the air control vent 26 is now moved in closer to the center of the chute so as to be in almost direct line with the line of descent. This means that air trapped at the outer periphery of the chute flows towards the center of the chute where it escapes through the air vent 26 and through the opening 30 in the chute center portion so that in effect the descent of the chute is guided by a column of air passing through the vent 26 and the center of the chute.

Once the operator has descended to a desired elevation above the earth the center control line 36 is released through the second quick release arrangement shown in Figure 6 and indicated generally as 64. This allows the center portion of the chute controlled by the line 36 to fly upwards so that the entire chute body is now opened to its maximum bearing capacity, thus effectively arresting the speed of descent.

In the arrangement shown, the chute packing mechanism and harness is standard and well known with the exception that the usual pack 70 containing the chute and risers is supplemented by the addition of the supplementary risers 14a. As shown in Figure 11, the chute is packed so that the chute portion 72 containing the chute canopy and shrouds is first released to the extent of the main risers 14. At the juncture between each of the risers 14 and the additional portions 14a a loop 15 is provided. Connecting cable lengths 55 are permanently fastened to each of the loops 15 and extend across the front portion of the chute harness to a connection with the quick release arrangement generally indicated at 50, as shown in Figure 6.

The quick release mechanism 50 includes a main plate 80 connected directly to the cross straps of the chute harness and a lever 84 pivotally mounted on the plate 80. With particular reference to Figure 8, the lever 84 has a hooked end 86 and is pivotally mounted on the plate 80 at 85. The cable lengths 55 pass through a frame portion 88 provided on the bracket 80 and their looped ends 55 and engaged by the hooked end 86 of the lever 84. The bracket frame 88 keeps the cables 55 in alignment with the lever 84 so that the tension is directed in the plane of the lever rather than backwards which would tend to pull the cable ends 55a off the hook 86. A ball-type friction catch 90 is provided on the bracket 80 to maintain the lever 84 in cable-retaining position. A laniard 92 is provided on the lower end of the lever 84 so that by an outward pull the lever 84 is pivoted about the point 85 leaving the two ends 55a of the cables free, causing the supplementary riser portions 14a to be instantly withdrawn from the pack 70 by the pull of the chute.

The control line 36 which, as shown in Figure 7, is withdrawn from the pack with the canopy and riser portions 14, is provided with a looped end 37 connected by a strap length 62 to a quick release mechanism 64 secured to the side straps of the harness, as shown most clearly in Figures 6 and 10. The quick release arrangement 64 illustrated is of a known type described and illustrated in United States Patent 2,473,554, June 21, 1949, and accordingly it is not thought necessary to describe it in detail. Briefly, the strap length 62 is connected to a toggle member indicated at 94 which is retained by a latch arrangement indicated at 96 which can be easily and quickly released by squeezing and tugging outwards.

In use, once the material or person has been dropped at the desired altitude, the chute is opened in the usual way, either manually or by a control line from the aircraft, to the position shown in Figure 1. Even in this condition the vent 26 and controlled center portion act to eliminate the usual drifting and swinging. To further stabilize the chute and to avoid drifting the speed of descent is increased by the releasing of the supplementary harness or riser portions 14a, placing the chute in the second position shown in Figure 2.

As will be appreciated, in this second position the effective bearing area of the chute is decreased and by the placing of the vent 26 almost in the direct line of descent the air trapped within the chute is directed around the inner periphery of the chute until it emerges from the control vent 26. The air passing from the control vent 26 and also passing through the chute central opening 30 has a stabilizing effect against the usual rotational swinging movement of the chute body, as well as ensuring that the accelerated descent is in a more or less straight line.

Assuming that the person using the chute or the material supported by the chute has now reached an elevation where impact with the ground is imminent, the control line 36 is released completely. This allows the pressure of the air against the interior of the chute, and acting on the chute central portion, to bring the top central portion of the chute body quickly upwards into its most effective bearing position, as shown in dotted lines in Figure 2. At the same time the vent 26 is disposed in its normal position reducing the direct effect of escaping air. This combined effect gives an almost instantaneous check or stop to the fall of the body so that the impact of contact with the ground is reduced to a minimum.

It will be appreciated by reference to the preceding description and the accompanying drawings that the main factors controlling the variance of conformation of the chute body, and consequently the speed of descent, do not depend on any action from the operator apart from the releasing of the supplementary harness or riser straps 14a and the control line 36. Since the central portion of the chute body is retained at a fixed distance from the body or material being dropped by the predetermined length of the control line 36, this relative position does not vary while the release of the riser portions 14a allows the shroud lines 12 and consequently the chute peripheral portion 16, under the influence of the air trapped within the chute body, to rise almost immediately giving the chute body the conformation shown in Figure 2. The final release of the control line 36, again under the influence of the air trapped within the chute body, causes the top central portion of the chute to fly upwards completing the maximum load-bearing conformation of the chute. There is no necessity for the user of the chute to apply manual tension or pressure to the control line or risers to vary the chute conformation.

I claim:

1. A controllable parachute construction comprising a main canopy having a central opening, a suspension harness, a plurality of primary shroud lines extending from about the outer periphery of said canopy to a connection with a pair of elongated harness risers extending to said suspension harness, a portion of the length of each of said risers being folded on itself and releasably secured to a first release means attached to said suspension harness, an annular seam about the central portion of said canopy body in radially spaced relationship from said central opening defining therebetween a canopy top portion constituting a minor portion of the total bearing area of said canopy, a plurality of secondary shroud lines connected to said canopy along said annular seam and extending therefrom to a central connection with one end of an elongated control line, the other end of said control line being releasably secured to a second release means attached to said suspension harness, air vent means adjacent the outer periphery of said canopy, said first and second release means on said suspension harness being adapted to separately control said risers and said control line whereby the effective bearing surface of said canopy when opened and sustaining a load can be decreased by the release of said folded riser portions increasing the length of said risers relative to the fixed length of said control line and in sequence can be sharply increased by release of the said control line end from said suspension harness.

2. A controllable parachute construction, as claimed in claim 1, wherein said air vent means comprises an annular opening extending completely about said canopy body in inwardly spaced relationship from the outer peripheral marginal portions thereof and being adapted upon extension of said riser portions, and prior to the release of said control line, to be disposed about the upper bearing surface of said canopy.

3. A controllable parachute construction comprising a main canopy having a central opening, primary suspension members including a plurality of shroud lines extending from the outer periphery of said canopy to a pair of spaced apart harness risers extending to a suspension harness, a portion of the length of each of said risers being folded on itself and releasably secured to a first release means attached to said suspension harness, an annular member connected to and bordering the central opening of said canopy, an annular seam in said canopy body disposed in radially spaced apart relationship from said annular member defining therebetween a canopy top portion constituting a minor portion of the total bearing surface of said canopy, secondary shroud lines connected to said canopy along said annular seam and extending to a central connection with one end of a control line, the other end of said control line being releasably secured to a second release means attached to said suspension harness, an annular vent in said main canopy extending completely about the body of said canopy and in inwardly spaced relationship from the outer peripheral margin of said canopy, said first and second release means on said suspension harness being adapted to separately control said risers and said control line whereby the effective bearing surface of said canopy when opened can be reduced by the extension of the length of said risers relative to the length of said control line and in sequence can be sharply increased by the release of said control line end from said harness.

4. A controllable parachute construction comprising a main canopy having a central opening and a relatively narrow annular vent about the body of said canopy in inwardly spaced apart relationship from the outer peripheral marginal edge, primary shroud lines extending from the outer peripheral edge of said canopy to the risers of a suspension harness, said risers being controllably adjustable as to length by providing riser portions folded on themselves and releasably secured to a first release means attached to said suspension harness, secondary shroud lines connected to a central portion of said canopy about an annular line disposed in radially spaced apart relationship from said canopy central opening to define a canopy top portion constituting a minor portion of the total bearing surface of said canopy, said secondary shroud lines being connected to one end of an elongated control line of predetermined length with the other end of said control line being connected to a second release means attached to said suspension harness, whereby the length of said risers between canopy and harness can be controllably extended relative to the length of said control line and said control line end released from connection with said suspension harness, whereby the effective bearing surface of said canopy in use is adapted to be varied between a first opening position with said canopy center section depressed along said annular attachment line to a point beneath the outer surface of said canopy but above the lower peripheral edge of said main canopy, a second accelerated descent position with said canopy center portion retained in said first position and said outer peripheral edge permitted to rise so that said annular attachment line is disposed considerably beneath the lower peripheral edge of said canopy, and a third maximum supporting or descent checking position with said canopy center portion released and following the contour of said main canopy.

5. A controllable parachute construction comprising a main canopy having a central opening, primary suspension cords extending from the outer periphery of said canopy to a connection with the risers of a suspension harness, said risers being adjustable as to length and including extensible portions folded on themselves and releasably secured to said suspension harness, secondary shroud lines connected to said canopy about an annular line disposed in spaced apart concentric relationship from said canopy central opening, said secondary shroud lines being centrally connected to a control line extending from said canopy to a releasable connection with said suspension harness, and an annular vent provided in said canopy extending completely around said canopy between and in spaced apart relationship from the outer periphery of said canopy and said secondary shroud annular attachment line, the portion of said canopy between said central opening and the said annular attachment line providing a canopy top portion constituting a minor portion of the total bearing surface of said canopy and acting in combination with said annular vent as a controlling element adapted to return said canopy center portion to full open condition when said control line is released, whereby the effective bearing surface of said parachute canopy from a first supporting formation when initially opened can be reduced in a controlled degree by extension of the folded length of said harness risers permitting the outer periphery of said canopy to rise relative to the central portion of said canopy retained by said control line, and a release of said central control line allows said canopy central portion under the influence of trapped air to return to and beyond its original position bringing the formation of said canopy to its maximum bearing contour.

References Cited in the file of this patent

UNITED STATES PATENTS

| | | |
|---|---|---|
| 2,127,895 | Tingle | Aug. 23, 1938 |
| 2,342,287 | Lisi | Feb. 22, 1944 |
| 2,473,554 | Warner et al. | June 21, 1949 |
| 2,784,927 | Turolla | Mar. 12, 1957 |

FOREIGN PATENTS

| | | |
|---|---|---|
| 773,942 | France | Sept. 10, 1934 |
| 1,092,378 | France | Nov. 10, 1954 |